United States Patent
Smith

(10) Patent No.: US 11,840,988 B1
(45) Date of Patent: Dec. 12, 2023

(54) FILM COOLING WITH ROTATING DETONATION ENGINE TO SECONDARY COMBUSTION

(71) Applicant: Venus Aerospace Corp., Houston, TX (US)

(72) Inventor: Aaron Ezekiel Smith, Hermosa Beach, CA (US)

(73) Assignee: Venus Aerospace Corp., Houston, TX (US)

( * ) Notice: Subject to any disclaimer, the term of this patent is extended or adjusted under 35 U.S.C. 154(b) by 0 days.

(21) Appl. No.: 18/178,456

(22) Filed: Mar. 3, 2023

(51) Int. Cl.
  *F02K 9/64* (2006.01)
  *F02K 9/96* (2006.01)
  *F23R 7/00* (2006.01)

(52) U.S. Cl.
  CPC .................. *F02K 9/64* (2013.01); *F02K 9/96* (2013.01); *F23R 7/00* (2013.01)

(58) Field of Classification Search
  CPC ... F02K 9/08; F02K 9/56; F02K 9/563; F02K 9/58; F02K 9/64; F02K 9/96; F02K 9/972; F02K 99/00; F23R 7/00; F23R 2900/03042
  See application file for complete search history.

(56) References Cited

U.S. PATENT DOCUMENTS

| | | | |
|---|---|---|---|
| 3,383,855 A | 5/1968 | Frederick et al. | |
| 4,236,378 A | 12/1980 | Vogt | |
| 5,735,126 A | 4/1998 | Schulte-Werning | |
| 8,677,756 B2 | 3/2014 | Poyyapakkam et al. | |
| 8,938,971 B2 | 1/2015 | Poyyapakkam et al. | |
| 8,959,921 B2 | 2/2015 | Khan et al. | |
| 11,022,313 B2 | 6/2021 | Boardman et al. | |
| 2012/0060464 A1* | 3/2012 | Grote | F02K 9/972 60/206 |
| 2021/0140641 A1* | 5/2021 | Singh | F02C 5/02 |

FOREIGN PATENT DOCUMENTS

| | | |
|---|---|---|
| CN | 2608844 Y | 3/2004 |
| CN | 102287801 B | 4/2013 |
| CN | 102269424 B | 1/2014 |
| CN | 103670797 B | 12/2015 |
| CN | 110552815 B | 12/2020 |
| CN | 110631049 B | 12/2020 |
| CN | 112254123 A | 1/2021 |
| CN | 214038382 U | 8/2021 |
| EP | 2496882 B1 | 3/2018 |
| KR | 101777320 B1 | 9/2017 |
| RU | 2271460 C2 | 3/2006 |

* cited by examiner

*Primary Examiner* — Scott J Walthour

(57) ABSTRACT

A rocket engine system including a coolant source containing a coolant fuel. The coolant source for providing the coolant fuel to a first surface of a wall partially defining a combustion chamber of a rocket engine, and the coolant fuel provides film cooling of the first surface of the wall. An oxidizer source for providing an oxidizer to a second surface of the wall. A monitor configured to control flow of the coolant fuel and the oxidizer, and to ensure that a stoichiometry of a combination of the coolant fuel and the oxidizer, after the coolant fuel has completed the film cooling of the first surface of the wall, is appropriate for generating a combustion of the combination of the coolant fuel and the oxidizer.

21 Claims, 11 Drawing Sheets

(a) CONTINUOUS INJECTION (b) SLOT INJECTION

US 11,840,988 B1

FILM COOLING WITH ROTATING DETONATION ENGINE TO SECONDARY COMBUSTION

BACKGROUND

The embodiments of the present invention relate generally to rockets, rocket engines, and cooling systems therefor.

SUMMARY

Various embodiments of the present invention relate to rocket engine systems with improved cooling.

In one embodiment, a rocket engine and cooling system include a coolant source for providing a coolant, a propellant source, a pressurization system, and a heat exchanger. In some embodiments, one or more of the coolant source and the propellant source is in operative communication with the pressurization system and the rocket engine such that the coolant can be pressurized and then heated by a heat exchanger. In various embodiments, the coolant is heated to a temperature and pressure such that the coolant is at a supercritical state. In various embodiments, the coolant is heated to a temperature and pressure which is below the temperature or pressure at which the coolant reaches a supercritical state. In various embodiments, the coolant is heated to a temperature and pressure which is above the temperature or pressure at which the coolant reaches a supercritical state.

In one embodiment, the propellant source includes one or more of a fuel, an oxidizer, and a coolant. In various embodiments, the oxidizer may be pre-mixed with the fuel, and the coolant.

In various embodiments, the coolant may be a fuel, an oxidizer, or an inert coolant.

In various other embodiments, the rocket engine and cooling system includes a cooling system with a coolant source for providing coolant, a fuel system with a fuel source for providing fuel, an oxidizer system with an oxidizer source for providing an oxidizer, a propellant pressurizing system with a pressurization source for pressurizing the propellant, and a heat exchanger. In various embodiments, the pressurization source communicates with the coolant after the coolant passes through the rocket engine and the heat exchanger. One such embodiment is referred to herein as an expander cycle.

In some embodiments, the improved rocket engine system includes a cooling system with a coolant source for providing coolant, a fuel system with a fuel source for providing fuel, an oxidizer system with an oxidizer source for providing an oxidizer, a propellant pressurizing system with a pressurization source for pressurizing the propellant, and a heat exchanger. In some embodiments, the pressurization source communicates with the coolant after the coolant passes through the rocket engine and the heat exchanger (e.g., an expander cycle), and an aerospike nozzle which is cooled by the coolant after the coolant has powered the pressurization system.

Some embodiments of the present invention include a cooling system with a coolant source for providing coolant, a fuel system with a fuel source for providing fuel, an oxidizer system with an oxidizer source for providing an oxidizer, a propellant pressurizing system with a propellant pressurizing source for pressuring the propellant, and a preburner. In one such embodiment, the pressurization source is driven by the coolant after the coolant passes through the rocket engine and heat exchanger (e. g., an expander cycle). The preburner is used to achieve a side combustion reaction between the fuel and the oxidizer wherein the coolant is heated to a temperature and pressure such that the coolant is at a supercritical state. In various embodiments, the preburner is used to achieve a side combustion reaction between the fuel and the oxidizer wherein the coolant is heated to a temperature and pressure which is below the temperature or pressure at which the coolant reaches a supercritical state. In various embodiments, the preburner is used to achieve a side combustion reaction between the fuel and the oxidizer wherein the coolant is heated to a temperature and pressure which is above the temperature or pressure at which the coolant reaches a supercritical state.

Some embodiments of the present invention include a cooling system utilizing a coolant fuel to provide film cooling and wherein the coolant fuel is subsequently used to generate a secondary combustion. In one such embodiment, an oxidizer is combined with the coolant fuel after the coolant fuel has been used for film cooling. In various embodiments, the amount of coolant fuel and the amount of oxidizer are controlled to ensure that the stoichiometry between the coolant fuel and oxidizer is appropriate for the secondary combustion.

BRIEF DESCRIPTION OF THE DRAWINGS

These and other characteristics of the present invention will be more fully understood by reference to the following detailed description in conjunction with the attached drawings, in which.

Figure 1:
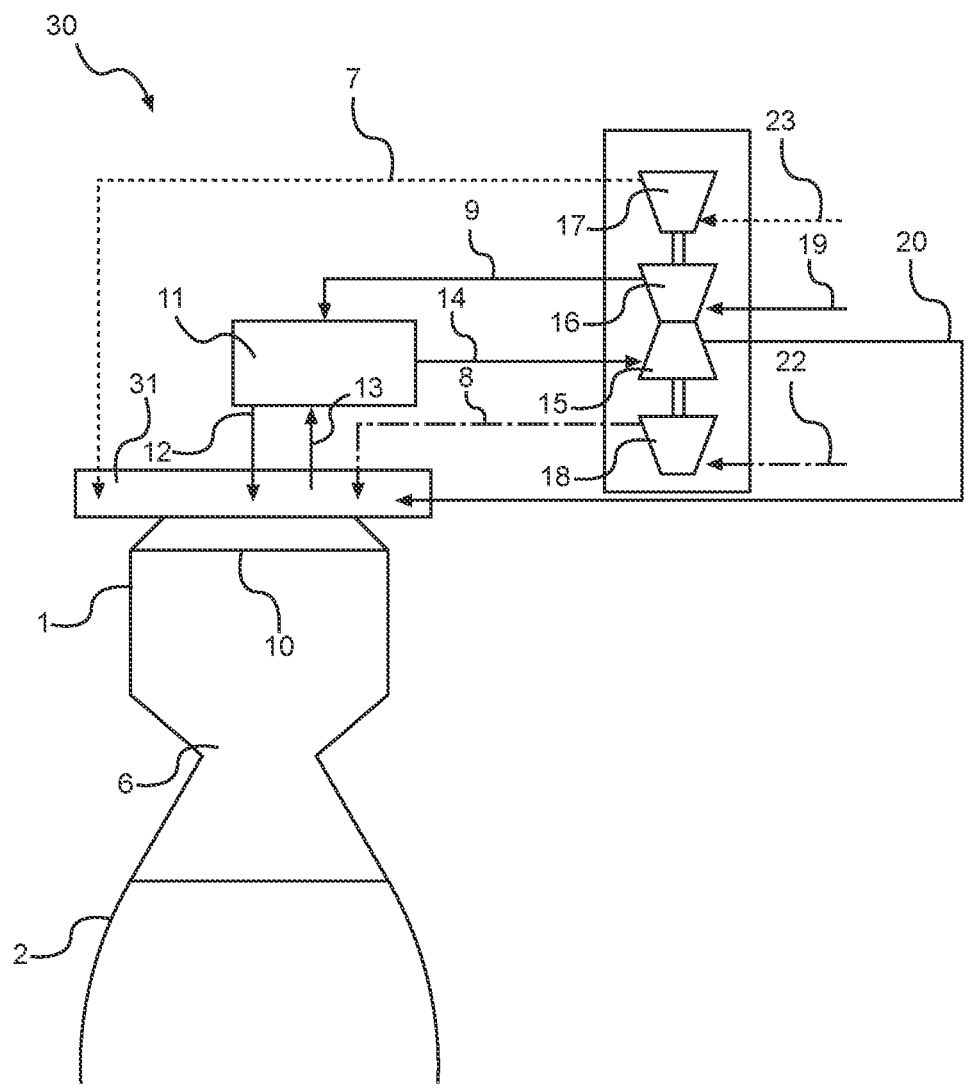
FIG. 1 is a detailed schematic view of an embodiment of an improved rocket engine system wherein the coolant is heated to a temperature and pressure such that the coolant is at a supercritical state, or the coolant is heated to a temperature or pressure which is below the temperature or pressure at which the coolant reaches a supercritical state, or the coolant is heated to a temperature and pressure which is above the temperature or pressure at which the coolant reaches a supercritical state according to embodiments of the present invention, and FIG. 1 schematically depicts a coolant source, a fuel source, an oxidizer source, a pressurization system, a heat exchanger, and rocket engine, in accordance with embodiments of the present invention.

The drawings referred to in this brief description of the drawings should not be understood as being drawn to scale unless specifically noted.

DETAILED DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included in the spirit and scope of the various embodiments. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail so as not to unnecessarily obscure aspects of the described embodiments.

Reference throughout this specification to "one embodiment," "certain embodiments," "an embodiment," "various embodiments," "some embodiments," or similar term(s) means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

Although one or more embodiments of the present invention have been described in some detail for clarity of understanding, it will be apparent that certain changes and modifications may be made within the scope of the various embodiments. Accordingly, the described embodiments are to be considered as illustrative and not restrictive, and the scope of the various embodiments is not to be limited to details given herein, but may be modified. In the various embodiments, elements and/or any described steps do not imply any particular order of operation, unless explicitly stated therein.

It should be noted that the process of combustion is integral to many types of combustion engines including, but not limited to, rocket engines. The process of combustion is commonly defined as either a "deflagration" or as a "detonation".

In a deflagration combustion, the combustion wave which is generated will typically have a maximum velocity which is deeply sub-sonic. Furthermore, a deflagration combustion typically generates a blast overpressure of significantly less than 20 times the initial combustion pressure. Hence, the deflagration combustion process is sometimes referred to as being approximately an isobaric combustion.

In a detonation combustion, flame velocities typically reach supersonic speeds and, in fact, can reach speeds on the order of several thousand meters per second. Additionally, detonation combustion processes are capable of generating an overpressure which can significantly exceed 20-100 times the initial combustion pressure. Thus, the detonation combustion process is sometimes referred to as being an approximately isochoric combustion. Moreover, when compared to deflagration, detonation has a faster heat release, a reduced entropy, and a greater thermal efficiency.

As a result of the advantageous characteristics of a detonation combustion, detonation-based propulsion engines (e.g., detonation-based rocket engines) have been developed. One type of detonation-based rocket engine is a rotating detonation engine (RDE), sometimes referred to as a continuously rotating detonation engine (CRDE). For purposes of brevity and clarity, the following description may refer to a rotating detonation engine, a rotating detonation rocket engine, or the like, when describing various embodiments of the present invention. It should be noted, however, that various embodiments of the present invention may be well suited to use in various other types of detonation-based propulsion engines.

Referring now to FIGS. 1-4, in various embodiments, the present invention is an improved rocket engine system wherein the coolant is heated to a temperature and pressure such that the coolant is at a supercritical state, or the coolant is heated to a temperature and pressure which is below the temperature or pressure at which the coolant reaches a supercritical state, or the coolant is heated to a temperature and pressure which is above the temperature or pressure at which the coolant reaches a supercritical state according to embodiments of the present invention. A person of ordinary skill in the art will understands that the flow circuit shown in the various Figures is simplified so as not to obscure the invention with unnecessary detail. Additionally, it will further be understood by those of ordinary skill in the art that there are also a number of valves, ancillary lines, and by-pass pathways, which may not be shown in the Figures so as not to obscure the invention with unnecessary detail.

In various embodiments of the present invention, the coolant is solely or partially composed of, for example, non-reacting materials. Such non-reacting materials include, but are not limited to, for example, carbon dioxide ($CO_2$), nitrogen ($N_2$), or water ($H_2O$). In various embodiments of the present invention, the coolant is solely or partially composed of, for example, reacting materials. Such reacting materials include, but are not limited to, for example, peroxide ($H_2O_2$), nitrous oxide ($N_2O$), ammonia ($NH_3$), or propane ($C_3H_8$).

In various embodiments of the present invention, when the coolant is solely or partially composed of water, several advantages are realized. For example, when using water as a coolant, the presence of water will beneficially reduce or slow down the reaction kinetics of the fuel and the oxidizer thereby improving the performance of the rocket engine. Such a benefit is particularly important in detonation rocket engines as the reduction in the reaction kinetics enables more efficient mixing and subsequent detonation of, for example, the fuel and the oxidizer. Additionally, as the density of water is greater than the density of most conventional coolants, a given mass of water can be stored in a smaller (and correspondingly lighter) tank than is required to store the same mass of less-dense conventional coolants. Furthermore, the higher density of water compared to the density of conventional coolants results in an improved specific impulse (specific impulse is often denoted as $I_{sp}$) when using water compared to the specific impulse corresponding to the use of less-dense conventional coolants. Also, water is much more readily available, much less toxic, and much less expensive than the availability, toxicity, and cost of many conventional coolants.

It should be noted that water can be used as the coolant in various embodiments of the present invention described below. It should further be noted that the following description of the various embodiments of the present invention are well suited, but not limited to, the various non-reacting materials and/or reacting coolants listed above.

Referring now to FIG. 1, in various embodiments of the present invention, the rocket engine system uses propellant that includes a fuel source stored in a vehicle or other structure coupled with the rocket engine. The fuel is delivered to the engine via the fuel feedline 23. An oxidizer source stored in the vehicle or other structure coupled to the rocket engine, delivers the oxidizer to the engine via the oxidizer feedline 22. Also, FIG. 1, schematically depicts a coolant source stored in a vehicle or other structure coupled with the rocket engine. The coolant is delivered to the engine via the coolant feedline 19. The coolant source is in communication with a pressurization system. In various embodiments, the present invention includes a turbine 15, coolant pump 16, fuel pump 17, and oxidizer pump 18. In various embodiments, the coolant pump 16 is in communication with a heat exchanger 11 via, for example, a high-pressure coolant line 9. In various embodiments, the fuel pump 17 is in communication with the injector manifold 10 through, for example, a fuel high-pressure fuel line 7. In various embodiments, the oxidizer pump 18 is in communication with the injector manifold 10 through, for example, a high-pressure oxidizer line 8.

In various embodiments of the present invention, the coolant temperature is increased in the heat exchanger 11 to a temperature and pressure such that the coolant is at a supercritical state (herein referred to as supercritical coolant). In various embodiments of the present invention, the coolant temperature is increased in the heat exchanger 11 to a temperature and pressure which is above the temperature or pressure at which the coolant is at a supercritical state (herein referred to as above-supercritical coolant). In various embodiments of the present invention, the coolant temperature is increased in the heat exchanger 11 to a temperature and pressure which is below the temperature or pressure at which the coolant is at a supercritical state (herein referred to as sub-supercritical coolant).

In various embodiments of the present invention, supercritical coolant is then in communication with coolant channels built into the outer wall 4 via, for example, a coolant heat exchanger outlet line 12. In one embodiment, the supercritical state is temperature and pressure just into the supercritical regime of the coolant used. For example, if water is used as the supercritical coolant, the temperature may be raised to between 374-392° C., and the pressure to between 220-231 bar. The coolant may thus be raised to a just-supercritical state, just above the critical pressure and temperature, where there is a significant increase in convective heat transfer due to the lower viscosity and higher conductivity of the fluid. The internal coolant channels are integrated into the wall via manifolds and passages as those skilled in the art are familiar with. The coolant cools the engine walls including the throat 6 and portion of the nozzle 2 before returning to the heat exchanger 11 via the hot coolant inlet 13. The coolant after exchanging heat with the incoming coolant, exits the heat exchanger 11 and enters the coolant turbine 15 via the hot coolant heat exchanger outlet 14. After the coolant provides the power for the pressurization system, the coolant enters the injector manifold 10 via the turbine outlet line 20, and enters the combustion chamber 1 with the fuel and propellant and exits the rocket engine through the throat 6.

In other embodiments of the present invention, sub-supercritical coolant is in communication with coolant channels built into the outer wall 4 via, for example, a coolant heat exchanger outlet line 12. For example, if water is used as the sub-supercritical coolant, the temperature may be raised to below 374-392° C., and/or the pressure is below between 220-231 bar such that the sub-supercritical coolant is, by the time it reaches the most critical point of the cooling passages (e. g., in a RDRE, abeam the detonation wave), raised to a just-supercritical state, just above the critical pressure and temperature, where there is a significant increase in convective heat transfer due to the lower viscosity and higher conductivity of the fluid. The internal coolant channels are integrated into the wall via manifolds and passages as those skilled in the art are familiar with. The coolant cools the engine walls including the throat 6 and portion of the nozzle 2 before returning to the heat exchanger 11 via the hot coolant inlet 13. The coolant after exchanging heat with the incoming coolant, exits the heat exchanger 11 and enters the coolant turbine 15 via the hot coolant heat exchanger outlet 14. After the coolant provides the power for the pressurization system, the coolant enters the injector manifold 10 via the turbine outlet line 20, and enters the combustion chamber 1 with the fuel and propellant and exits the rocket engine through the throat 6.

In other embodiments of the present invention, above-supercritical coolant is in communication with coolant channels built into the outer wall 4 via, for example, a coolant heat exchanger outlet line 12. For example, if water is used as the sub-supercritical coolant, the temperature may be raised to above 374-392° C., and/or the pressure is above between 220-231 bar. In such an embodiment, the above-supercritical coolant. The internal coolant channels are integrated into the wall via manifolds and passages as those skilled in the art are familiar with. The coolant cools the engine walls including the throat 6 and portion of the nozzle 2 before returning to the heat exchanger 11 via the hot coolant inlet 13. The coolant after exchanging heat with the incoming coolant, exits the heat exchanger 11 and enters the coolant turbine 15 via the hot coolant heat exchanger outlet 14. After the coolant provides the power for the pressurization system, the coolant enters the injector manifold 10 via the turbine outlet line 20 and enters the combustion chamber 1 with the fuel and propellant and exits the rocket engine through the throat 6.

Figure 2:
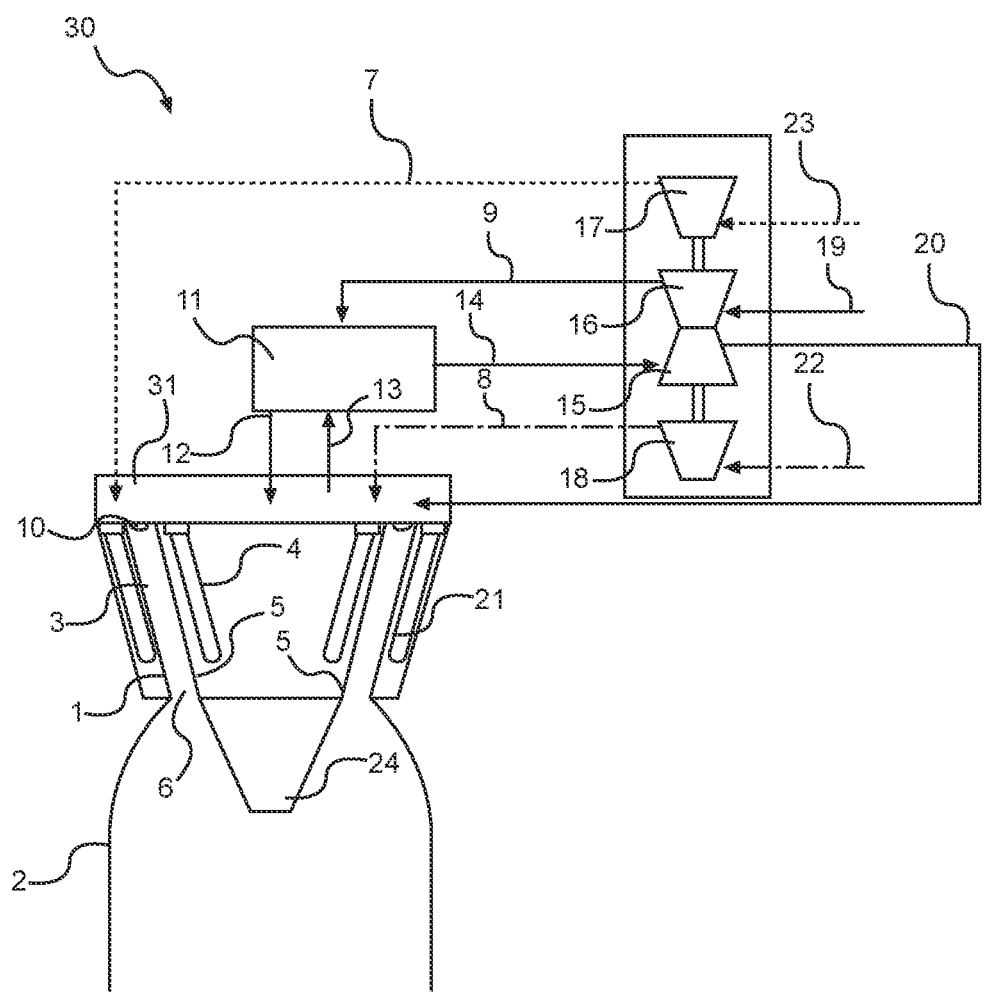
FIG. 2 is a detailed schematic view of an embodiment of an improved rocket engine system wherein the coolant is heated to a temperature and pressure such that the coolant is at a supercritical state, or the coolant is heated to a temperature and pressure which is below the temperature or pressure at which the coolant reaches a supercritical state, or the coolant is heated to a temperature and pressure which is above the temperature or pressure at which the coolant reaches a supercritical state according to embodiments of the present invention, and FIG. 2 schematically depicts a coolant source, a fuel source, an oxidizer source, a pressurization system, a heat exchanger, and rocket engine with an aerospike nozzle, in accordance with embodiments of the present invention.

Referring now to FIG. 2, in various embodiments, the rocket engine system includes an aerospike nozzle 24 such that the combustion happens in an annulus 3 contained by an inner cowl 5 and outer cowl 1. In various embodiments, the aerospike nozzle 24 may also be any altitude-compensating nozzle, such as, but not limited to, a plug nozzle, an expanding nozzle, a single expansion ramp nozzle, a stepped nozzle, an expansion deflection nozzle, or an extending nozzle.

In various embodiments, for example, where the rocket engine system has an aerospike nozzle and the rocket engine is a rotating detonation rocket engine and there is an increased yet localized heat load near the injection point, the sub-supercritical coolant is introduced to the rocket engine at the area of localized heat load such that the sub-supercritical coolant heated to a supercritical state by the area of localized heat load to augment cooling of the rocket engine.

In various embodiments of the present invention, there are coolant channels 4 in the inner cowl 5 and coolant channels 21 in the outer cowl 1. Coolant (supercritical coolant, sub-supercritical coolant or above-supercritical coolant) from the heat exchanger outlet 12 first cools the inner cowl 5 via coolant channels 4 before returning to the heat exchanger 11 via the hot coolant heat exchanger inlet 13 as "hot coolant". The hot coolant, after exchanging heat with the incoming coolant, exits the heat exchanger 11 and enters the coolant turbine 15 via the hot coolant heat exchanger outlet 14. After the turbine 15 the coolant returns to the aerospike engine and cools the outer cowl 1 via coolant channels 21. The coolant channels 4 and 21 are integrated into the cowls via manifolds and passages as those skilled in the art are familiar with. After the coolant provides the power for the pressurization system, the coolant enters the injector manifold 10 via the turbine outlet line 20, and enters the combustion chamber annulus 3 with the fuel and propellant and exits the rocket engine through the throat 6.

Figure 3:
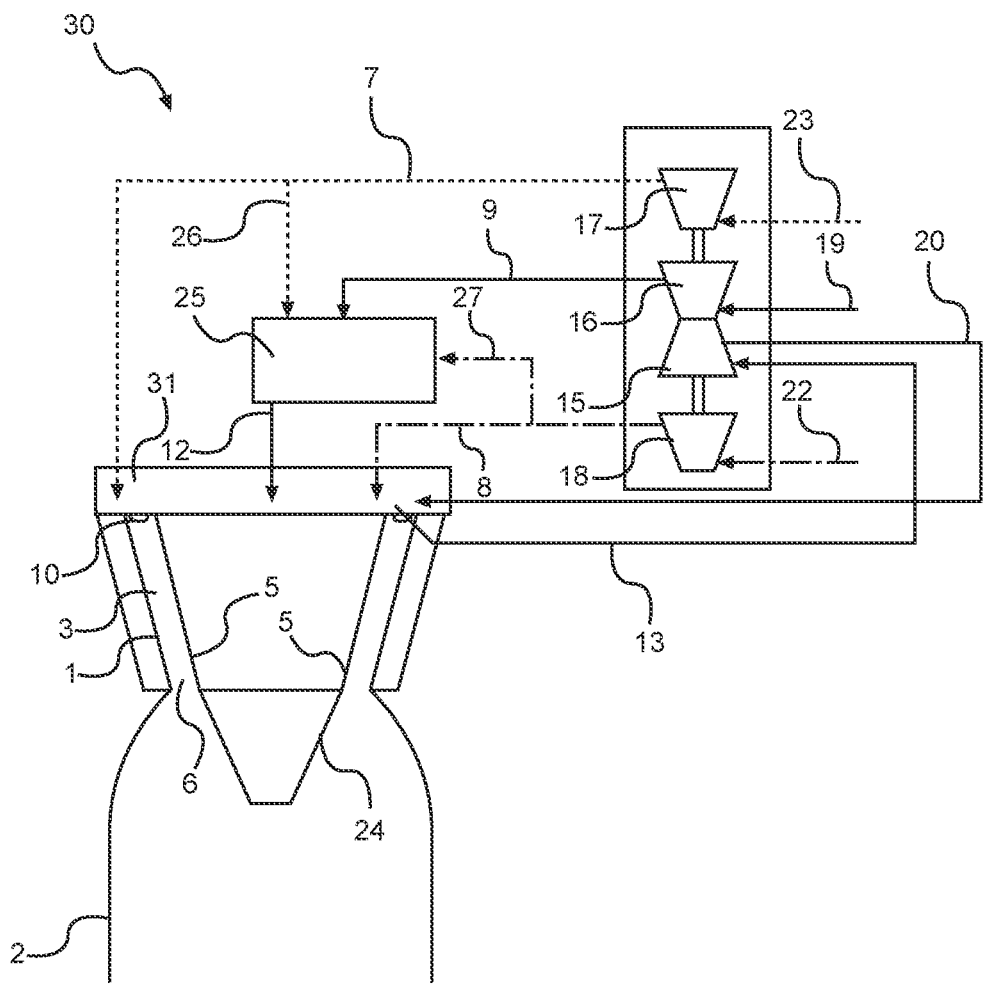
FIG. 3 is a detailed schematic view of an embodiment of an improved rocket engine system wherein the coolant is heated to a temperature and pressure such that the coolant is at a supercritical state, or the coolant is heated to a temperature and pressure which is below the temperature or pressure at which the coolant reaches a supercritical state, or the coolant is heated to a temperature and pressure which is above the temperature or pressure at which the coolant reaches a supercritical state according to embodiments of the present invention, and FIG. 3 schematically depicts a coolant source, a fuel source, an oxidizer source, a pressurization system, a preburner, and a rocket engine with an aerospike nozzle, in accordance with embodiments of the present invention.

Referring now to FIG. 3, in various embodiments of the present invention, the rocket engine system uses a preburner 25 to add heat to the coolant (supercritical coolant, sub-supercritical coolant or above-supercritical coolant), completely or temporarily, for example just for startup, replacing or contributing to a heat exchanger. In various embodiments, fuel is diverted to the preburner from the high-pressure fuel line 7 via the fuel preburner inlet 26, and oxidizer is diverted to the preburner from the high-pressure oxidizer line 8 via the oxidizer preburner inlet 27.

Figure 4:
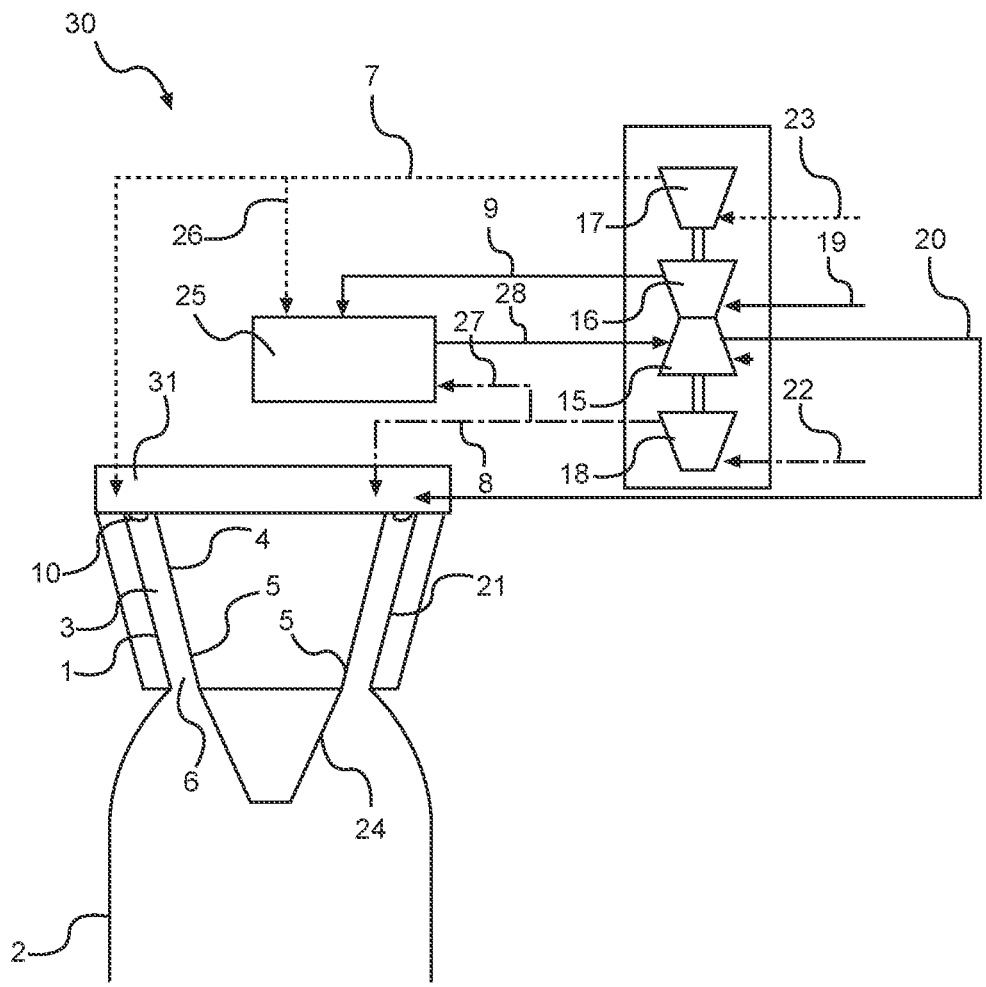
FIG. 4 is a detailed schematic view of an embodiment of an improved rocket engine system wherein the coolant is heated to a temperature and pressure such that the coolant is at a supercritical state, or the coolant is heated to a temperature and pressure which is below the temperature or pressure at which the coolant reaches a supercritical state, or the coolant is heated to a temperature and pressure which is above the temperature or pressure at which the coolant reaches a supercritical state according to embodiments of the present invention, and FIG. 4 schematically depicts a coolant source, a fuel source, an oxidizer source, a pressurization system, a preburner in an alternate configuration, and rocket engine with an aerospike nozzle, in accordance with embodiments of the present invention.

Referring now to FIG. 4, in various embodiments of the present invention, the rocket engine system uses a preburner 25 that powers the pressurization system and then is mixed with the coolant (supercritical coolant, sub-supercritical coolant or above-supercritical coolant) in the preburner 25 before powering the turbopump 15 via the turbine inlet line 28 before cooling the rocket engine via the engine coolant line 20.

Figure 5:
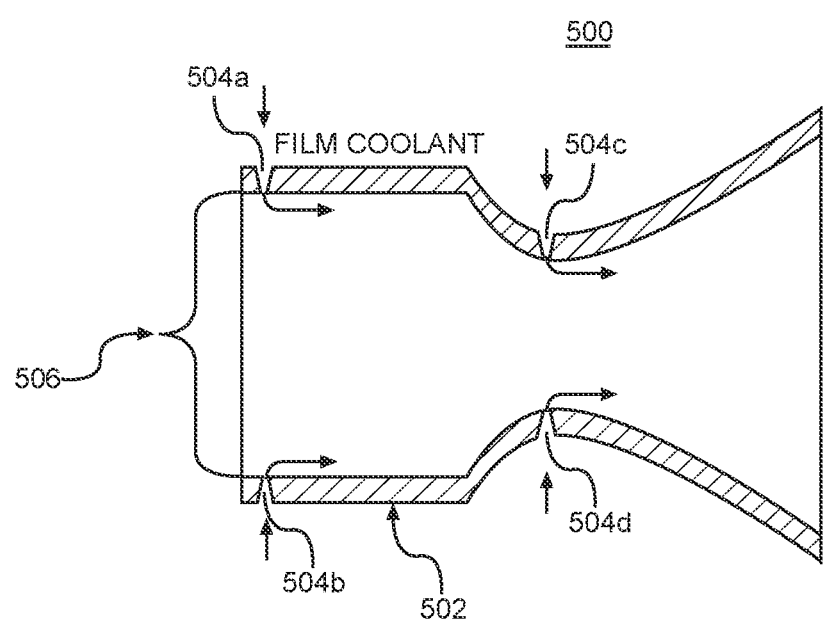
FIG. 5 is a schematic cut-away view of an embodiment of an improved rocket engine system wherein the coolant is applied to the rocket engine to achieve film cooling of the rocket engine, in accordance with embodiments of the present invention.

Referring now to FIG. 5, a schematic cut-away view 500 is provided depicting an embodiment of an improved rocket engine system. As shown in FIG. 5, coolant is applied to the rocket engine 502 to achieve film cooling of rocket engine 502, in accordance with embodiments of the present invention. In one embodiment of the present invention, the coolant is water. More specifically, in one embodiment, the water is applied to the interior surface of rocket engine 502. In various embodiments, by applying the water to the interior surface of rocket engine 502, the water provides film cooling and also provides a protective barrier to the interior surface of rocket engine 502. By providing a protective barrier, embodiments of the present invention produce a more reliable rocket engine. Specifically, the protective barrier provided by the present film cooling embodiments reduces the frequency to inspect, or even the need to replace, the combustion wall chambers of rocket engine 502. Hence, embodiments of the present invention are well suited to use with reusable rocket engines. That is, the various embodiments of the present invention can extend the life of a reusable rocket, and/or increase the number times that reusable rocket can be used.

Referring again to FIG. 5, as mentioned above, because the density of water is greater than the density of most conventional coolants, in various embodiments of the present invention, a given mass of water can be stored in a smaller (and correspondingly lighter) tank than is required to store the same mass of less-dense conventional coolants. Furthermore, as the higher density of water is greater than the density of many conventional coolants, embodiments of the present invention achieve in an improved specific impulse compared to the specific impulse corresponding to the use of less-dense conventional coolants (e. g., fuel, which is generally used in all rocket engines employing film cooling to date). Also, water coolant, as used in various embodiments of the present invention, is more readily available, less toxic, and less expensive than the availability, toxicity, and cost of many conventional coolants.

Referring still to FIG. 5, in various embodiments, the water is applied to the interior surface of rocket engine 502 at, or proximate, the combustion chamber 506. As stated previously, when using water as a coolant, the presence of water will beneficially reduce or slow down the reaction kinetics of the fuel and the oxidizer in combustion chamber 506, thereby improving the performance of rocket engine 502. Such a benefit is particularly important in detonation rocket engines as the reduction in the reaction kinetics enables more efficient mixing and subsequent detonation of, for example, the fuel and the oxidizer in the combustion chamber thereof.

Figure 6:
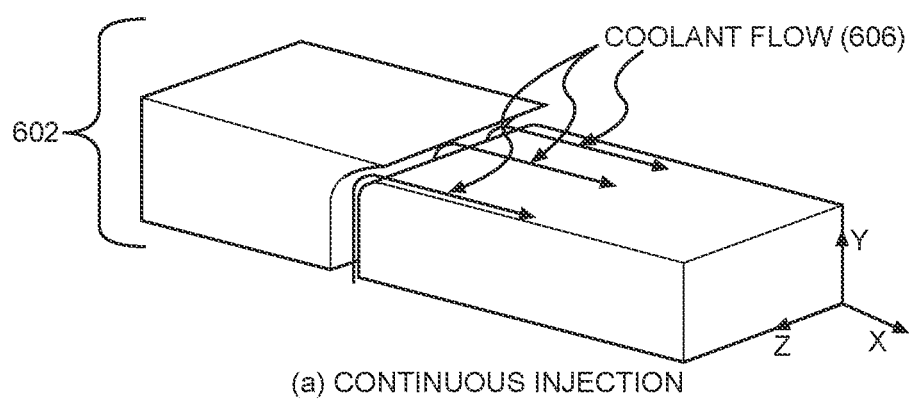
FIG. 6 is a perspective view of a continuous injection port and a slot injection port used to apply coolant to achieve film cooling of a rocket engine, in accordance with embodiments of the present invention.
Figure 6:
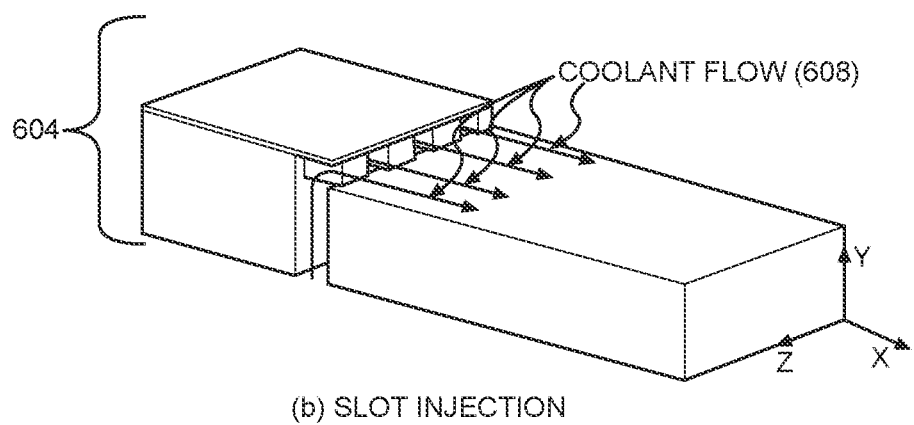

Still referring to FIG. 5, various ports 504a and 504b are located at, or proximate, the combustion chamber 506. FIG. 5 further depicts ports 504c and 504d. FIG. 6, to be discussed below, provides a detailed depiction of exemplary port configurations used in accordance with various embodiments of the present invention. Returning to FIG. 5, the water is applied to the interior surface of rocket engine 502 using one or more of ports 504*a*, 504*b*, 504*c* and 504*d*. Additionally, it should be noted that the various embodiments of the present invention are well suited to having a greater or lesser number of ports. The various embodiments of the present invention are also well suited to having the ports disposed at locations other than the locations depicted in FIG. 5.

Referring again to FIG. 5, it should be further noted that the film cooling embodiments corresponding to FIG. 5 are also well suited to being used in combination with any of the interior wall cooling embodiments described in detail above and corresponding to FIGS. 1-4. Furthermore, the film cooling embodiments of FIG. 5 are also well suited to being used in combination with ablative layers or other rocket engine cooling methodologies.

Although the above description of the embodiments of FIG. 5 (including the embodiments used in combination with the embodiments pertaining to FIGS. 1-4), specifically describes the use of water as the coolant, those various embodiments are also well suited to use with a coolant which is solely or partially composed of, for example, non-reacting materials other than water. Such non-reacting materials include, but are not limited to, for example, carbon dioxide (CO2), nitrous oxide (N2O) or nitrogen (N2). Additionally, the various embodiments corresponding to FIG. 5 (including the embodiments used in combination with the embodiments pertaining to FIGS. 1-4) are also well suited to use with a coolant which is solely or partially composed of, for example, reacting materials. Such reacting materials include, but are not limited to, for example, peroxide (H2O2), ammonia (NH3), or propane (C3H8).

Referring again to FIG. 5, in various embodiments of the present invention, the water is at a temperature and pressure such that the water is at supercritical state when applied to the interior surface of rocket engine 502. In various other embodiments of the present invention, the water is at a temperature and pressure which is above the temperature or pressure at which the water is at a supercritical state when applied to the interior surface of rocket engine 502. Moreover, in various embodiments of the present invention, the water is at a temperature and pressure which is below the temperature or pressure at which the coolant is at a supercritical state when applied to the interior surface of rocket engine 502. In such embodiments of the present invention, once the water is applied to the interior surface of the rocket engine, the water temperature or pressure is adjusted (i.e., increased or decreased) such that the temperature and pressure of the water corresponds to the supercritical state for water. For example, when water is introduced to the interior surface of rocket engine 502, at a sub-supercritical state or an above-supercritical state, the temperature of the water is adjusted, by the interior surface of rocket engine 502, to reach a range of approximately 374-392° C., and/or the pressure is adjusted to reach a pressure of between 220-231 bar at the point where maximum heat is being generated (e.g., in a RDE, adjacent to the detonation wave). In such an embodiment, the temperature and pressure of the water is thus adjusted to a supercritical state, where there is a significant increase in convective heat transfer due to the lower viscosity and higher conductivity of water when in a supercritical state.

Referring again to FIG. 5, in various embodiments, such as, for example, where the rocket engine system has an aerospike nozzle and the rocket engine is a rotating detonation rocket engine and there is an increased yet localized heat load near the injection point, the embodiments of the present invention inject the water onto the interior surface of rocket engine 502 at the area of localized heat to augment cooling of rocket engine 502.

With reference now to FIG. 6, a perspective view is provided of a continuous injection port 602 and a slot injection port 604 used to apply coolant (e.g., but not limited to, water) to the interior surface of rocket engine 502 (of FIG. 5), as described in conjunction with the embodiments of FIG. 5. As shown in FIG. 6, continuous injection port 602 is configured to distribute a substantially continuous stream of coolant, such as, but not limited to, water, onto the interior surface of rocket engine 502. Arrows 606 depict the flow direction of coolant along the interior surface of rocket engine 502. Similarly, in FIG. 6, slot injection port 604 is configured to distribute a non-continuous stream of coolant, such as, but not limited to, water, onto the interior surface of rocket engine 502. Arrows 608 depict the flow direction of coolant along the interior surface of rocket engine 502. Although a continuous injection port 602 and a slot injection port 604 are shown in FIG. 6, embodiments of the present invention are well suited to use with various other features, ports, and port shapes, types and configurations to enable the application of a coolant, such as, but not limited to, water, onto the interior surface of rocket engine 502.

The convection heat flux, $q=h\Delta T$, into the coolant is proportional to the convection coefficient h and temperature difference, $\Delta T=T_{combustion}-T_{coolant}$. In a supercritical state, the convection coefficient, h, increases significantly due to decreased viscosity and increased thermal conductivity of the coolant. The total heat transfer increases, even though the coolant temperature, $T_{coolant}$, has increased giving a subsequent decrease in $\Delta T$. Thus, the rocket engine can be cooled much more effectively and efficiently.

Figure 7:
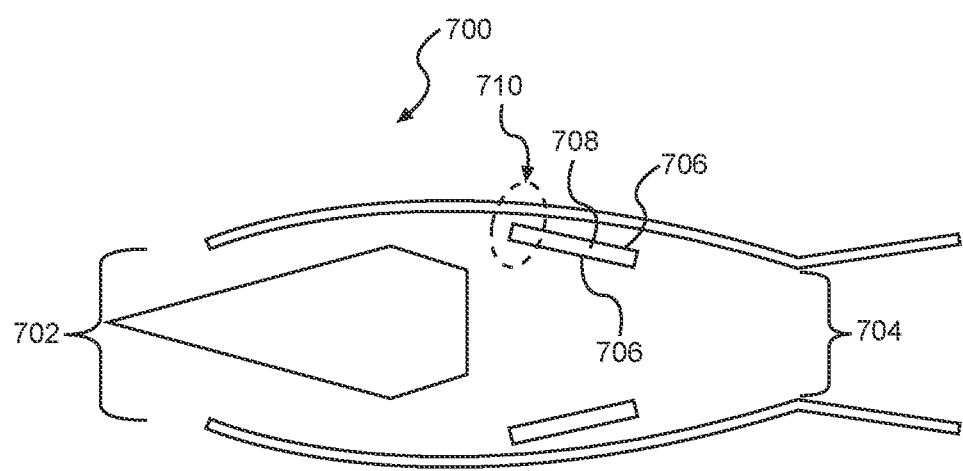
FIG. 7 is a schematic cut-away view of a rotating detonation engine, in accordance with embodiments of the present invention.

With reference now to FIG. 7, a schematic cut-away view of a rotating detonation engine 700 is provided. As will be described below, various embodiments of the present invention will beneficially achieve cooling of rotating detonation engine 700 while also generating a secondary combustion to increase the thrust of rotating detonation engine 700. It should be noted that in FIG. 7, various well-known components and structures are not depicted in detail to prevent unnecessarily obscuring aspects of the various described embodiments of the present invention.

FIG. 7 schematically depicts an air inlet region 702 and a combustion chamber 704. It will be understood that air inlet region 702, in some embodiments, enables air to be directed to combustion chamber 704. As depicted in FIG. 7, combustion chamber 704 typically includes annular walls represented as 706 which define an annulus 708 in which detonation occurs. For purposes of clarity, walls 706 are schematically represented in FIG. 7. It should be noted that more detailed representations of such walls, and corresponding detailed descriptions thereof, are provided below.

Additionally, as will be described in detail below, in various embodiments of the present invention, combustion chamber 704 may include a plurality of annuli and a corresponding plurality of walls defining the plurality of annuli. In such embodiments, detonation may occur in one or more of the annuli. Furthermore, in embodiments of the present invention having a combustion chamber comprised of plurality of annuli, detonation may occur concurrently in more than one or even all of the plurality of annuli.

With reference still to FIG. 7, a region 710 is depicted. Region 710 is the portion of rotating detonation engine 700 at which coolant is provided to walls 706 as described above in conjunction with the embodiments of FIGS. 1-6. It should be noted that some embodiments of the present invention will include one or more of the structures, features and processes described in the embodiments corresponding to FIGS. 1-6 above. More specifically, some embodiments of the present invention will include, for example, a turbine 15, coolant pump 16, fuel pump 17, and oxidizer pump 18 all of FIG. 1. Furthermore, in various embodiments of the present invention, the coolant pump 16 is in communication with a heat exchanger 11 via, for example, a high-pressure coolant line 9. Moreover, in various embodiments, the fuel pump 17 is in communication with the injector manifold 10 through, for example, a fuel high-pressure fuel line 7. In various embodiments, the oxidizer pump 18 is in communication with the injector manifold 10 through, for example, a high-pressure oxidizer line 8. For purposes of brevity and clarity, portions of the detailed description of the structures, features and processes of the embodiments previously described in conjunction with FIGS. 1-6 are not repeated in their entirety below.

Figure 8:
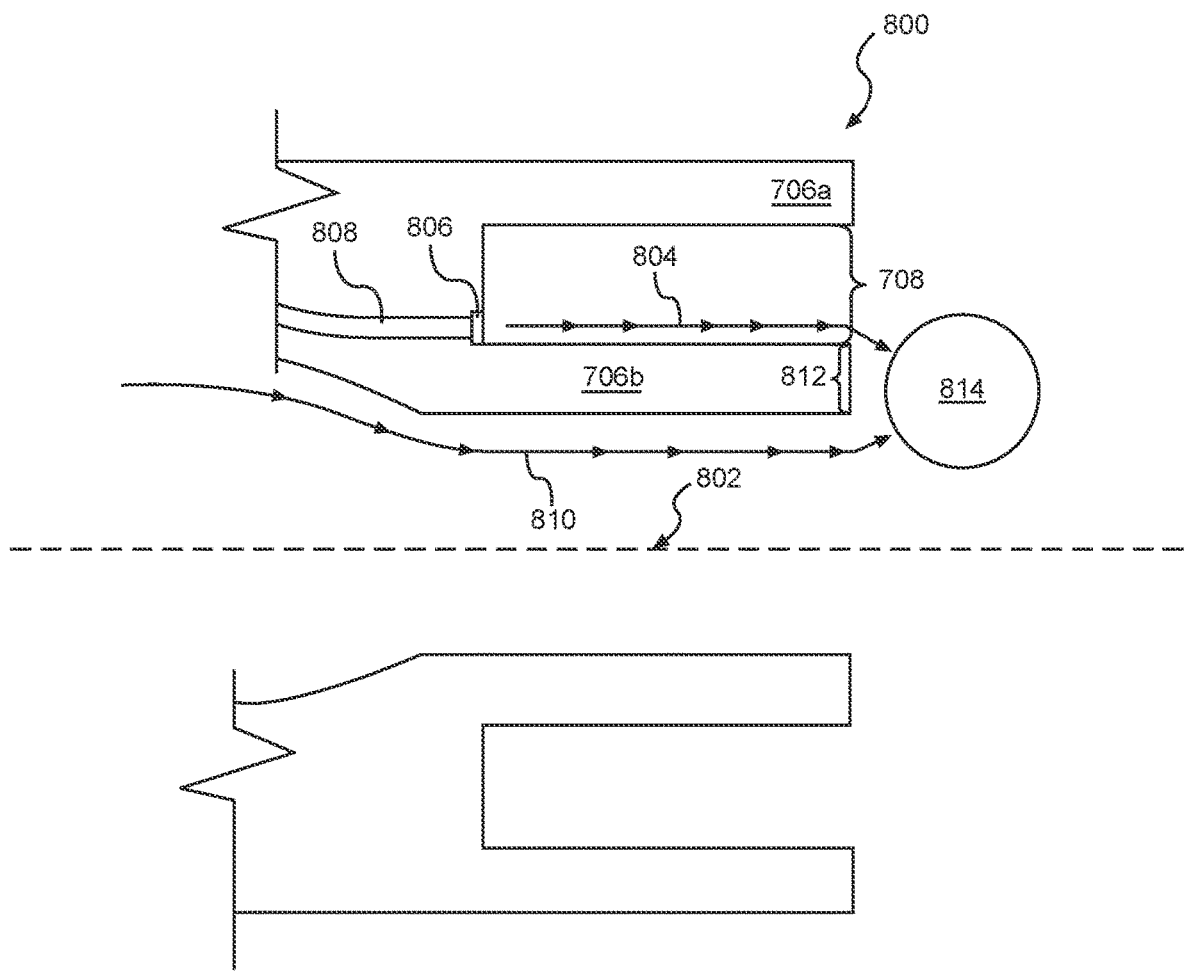
FIG. 8 is a cut-away view of walls defining an annulus wherein detonation occurs in a rotating detonation engine and wherein one wall is treated, in accordance with embodiments of the present invention.

Referring now to FIG. 8, a cut-away view 800 of walls 706 including region 710, both of FIG. 7, is provided. For clarity, as walls 706 are annular and as FIG. 8 is a cut-away view, a line of symmetry 802 is provided to illustrate the symmetric orientation of the features of depicted in FIG. 8. Additionally, in FIG. 8, walls 706 are shown in detail to clearly illustrate that two portions 706a and 706b define annulus 708 in which detonation occurs.

In embodiments of the present invention, fuel is applied to the interior side (i.e., the side closest to annulus 708) of wall 706b. More particularly, in various embodiments, fuel is provided via port 806 and channel 808 to enable film cooling, via the provided fuel, along the interior side of wall 706b. Embodiments of the present invention are well suited to use with various other features, cooling channels, port shapes, port types and port configurations, as described, for example, above in accordance with the detailed description of the embodiments of FIGS. 1-6, to enable the application of the coolant fuel onto the interior surface of wall 706b. The direction of flow of the fuel as it provides film cooling is depicted by line 804 in FIG. 8. In various embodiments, by applying fuel to the interior side of wall 706b, the fuel provides film cooling while also providing a protective barrier to the interior side of wall 706b. By providing a protective barrier, embodiments of the present invention produce a more reliable rocket engine. Specifically, the protective barrier provided by the fuel, and the corresponding film cooling of the interior side of wall 706b, reduces the frequency to inspect, or even the need to replace, wall 706b. Hence, embodiments of the present invention are well suited to use with reusable rocket engines. That is, the various embodiments of the present invention can extend the life of a reusable rocket, and/or increase the number times that reusable rocket can be used.

Referring still to FIG. 8, various embodiments of the present invention also provide an oxidizer along, for example, the exterior side (i.e., the side farthest from annulus 708) of wall 706b. The direction of flow of the oxidizer along the exterior surface of wall 706b is depicted by line 810 in FIG. 8. More particularly, in various embodiments, the oxidizer is provided via a port or ports, not shown. Furthermore, embodiments of the present invention are well suited to use with various other features, cooling channels, port shapes, port types, and port configurations, as described above in detail in accordance with the embodiments of FIGS. 1-6, to provide the oxidizer along the exterior surface of wall 706b. It should be noted that embodiments of the present invention are also well suited to use with various oxidizers including, but not limited to, air, liquid oxygen, hydrogen peroxide, and the like. Also, in various embodiments of the present invention, providing a flow of oxidizer along the exterior surface of wall 706b, as depicted by line 810, will cool wall 706b.

With reference again to FIG. 8, in various embodiments of the present invention, the oxidizer is at least partially comprised of air which is received, for example, at air inlet region 702 of FIG. 7, and then directed along the exterior surface of wall 706b, as depicted by line 810. In various embodiments, the air may be received, for example, at air inlet region 702 at subsonic or supersonic speeds. In some embodiments of the present invention, the flow rate of the air along line 810 is adjusted to achieve a desired air flow velocity. Additionally, in various embodiments, of the present invention, the oxidizer may be comprised of more than one oxidizing agent. As one example, air received at a supersonic speed may actually generate heat when directed along the exterior surface of wall 706b. In such an instance, embodiments of the present invention will also supply, for example, liquid oxygen along with the received air to ensure proper temperature management of exterior surface of wall 706b.

Referring still to FIG. 8, in embodiments of the present invention, the fuel used for film cooling of interior surface 706b and the oxidizer directed along the exterior surface of wall 706b will combine after they pass the rear edge 812 of wall 706b. A circle 814 is shown in FIG. 8 to figuratively depict a region at which the coolant fuel and the oxidizer combine. It should be noted that circle 814 is merely a graphical representation of the combination of the coolant fuel and the oxidizer, and that the combination of the coolant fuel and the oxidizer can occur at a region other than within or near circle 814.

Referring again to FIG. 8, in various embodiments of the present invention, once the fuel used for film cooling of interior surface 706b and the oxidizer directed along the exterior surface of wall 706b have passed the rear edge 812 of wall 706b, and have combined, a secondary combustion is generated. In embodiments of the present invention, the secondary combustion will occur due to sources of ignition readily present outside of annulus 708.

With reference again to FIG. 8, it will be understood that specific impulse (commonly abbreviated as $I_{sp}$) is an important factor when determining the efficiency of the thrust generated by, for example, a rotating detonation rocket engine. More particularly, the $I_{sp}$ value is a measurement of how efficiently a reaction mass engine, for example rotating detonation rocket engine 700 of FIG. 7, creates thrust from its fuel or other propellant. In embodiments of the present invention, the secondary combustion of the coolant fuel and the oxidizer generates additional thrust for rotating detonation rocket engine 700. As a result, embodiments of the present invention increase the efficiency, the $I_{sp}$ value, of rotating detonation rocket engine 700. Moreover, embodiments of the present invention beneficially and uniquely obtain a "two-for-one" advantage by first using the coolant fuel for film cooling and secondly using the same coolant fuel to generate a secondary combustion and corresponding additional thrust. Thus, embodiments of the present invention, unlike conventional film cooling approaches, do not merely expel or waste film coolant. Instead, embodiments of the present invention are able to cool surfaces within annulus 708 without wasted payload, wasted propellant, or impeding propellant flow through annulus 708. Further, embodiments of the present invention the obtain additional thrust from the coolant fuel via the secondary combustion. As stated previously, for purposes of brevity and clarity, portions of the present detailed description refer to a rotating detonation engine, a rotating detonation rocket engine, or the like, when describing various embodiments of the present invention. It should again be noted, however, that various embodiments of the present invention are well suited to use in various other types of detonation-based propulsion engines. Further, in various embodiments of the present invention, the combination of coolant fuel and oxidizer only occurs after the coolant fuel is no longer within annulus 708. That is, in embodiments of the present invention, the coolant fuel is utilized for film cooling within annulus 708, and the coolant fuel is used for a secondary combustion when no longer within annulus 708 (e.g., beyond rear edge 812 of wall 706*b*).

In embodiments of the present invention, the amount of coolant fuel and the amount of oxidizer are controlled to ensure that the stoichiometry between the coolant fuel and oxidizer is appropriate for combustion. More specifically, in embodiments of the present invention, the flow rate or volume of the coolant fuel and/or the flow rate or volume of the oxidizer are adjusted to ensure that, upon combination, the resulting stoichiometry of coolant fuel and oxidizer is suitable for combustion. As one example, when air is being used as the oxidizer, as the altitude and/or the velocity in which of rotating detonation engine 700 changes, the flow rate or volume of the coolant fuel and/or the flow rate or volume of the oxidizer are adjusted to ensure that, upon combination, the resulting stoichiometry of coolant fuel and oxidizer is suitable for combustion.

In one embodiment of the present invention, where a surplus of oxidizer is already present after detonation occurs in annulus 708, only the flow rate or volume of the coolant fuel may need to be adjusted to ensure that the combination of coolant fuel and oxidizer (beyond rear edge 812 of wall 706*b*) has a stoichiometry suitable for the secondary combustion. Similarly, in one embodiment of the present invention, where a surplus of coolant fuel is already present after detonation in annulus 708, only the flow rate or volume of the oxidizer may need to be adjusted to ensure that the combination of coolant fuel and oxidizer (beyond rear edge 812 of wall 706*b*) has a stoichiometry suitable for the secondary combustion. As yet another example, if air is being used as an oxidizer, and the air flow rate or volume is insufficient, when combined with the coolant fuel, to achieve a combustible stoichiometry, embodiments of the present invention will also supply, for example, liquid oxygen along with the received air to ensure the proper combustible stoichiometry upon combination beyond rear edge 812 of wall 706*b*. Hence, embodiments of the present invention differ from other film cooling approaches in that the various embodiments of the present invention adjust the flow rate or volume of the coolant fuel and/or adjust the flow rate or volume of the oxidizer to ensure that the combination of coolant fuel and oxidizer (beyond rear edge 812 of wall 706*b*) has a stoichiometry suitable for the secondary combustion.

Referring still to FIG. 8, embodiments of the present invention are also well suited to use in combination with various other cooling methodologies such as, but not limited to, the cooling methodologies described above in detail in accordance with the embodiments of FIGS. 1-6. For example, in some embodiments of the present invention, wall 706*a* is cooled as described in the embodiments corresponding to FIGS. 1-6, while wall 706*b* is treated as described in the embodiments corresponding to FIGS. 7-8.

Figure 9:
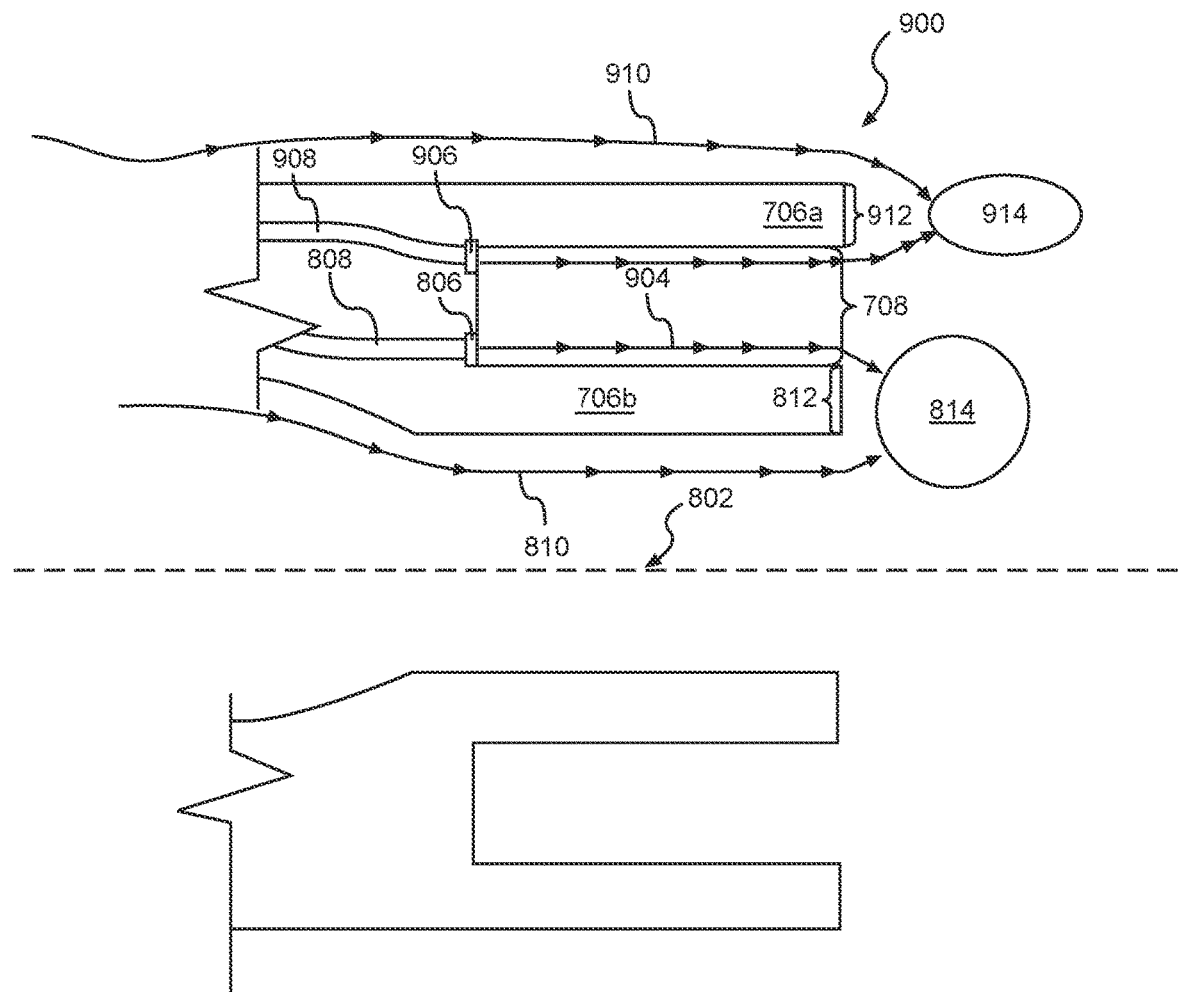
FIG. 9 is a cut-away view of walls defining an annulus wherein detonation occurs in a rotating detonation engine and wherein two walls are treated, in accordance with embodiments of the present invention.

Referring now to FIG. 9, a cut-away view 900 of walls 706*a* and 706*b* in which both wall 706*a* and wall 706*b* as described in the embodiments corresponding to FIGS. 7-8.

It will be understood that in the embodiment of FIG. 9, wall 706*b* is treated as described in the embodiments corresponding to FIGS. 7-8. For purposes of brevity and clarity, the discussion of wall 706*b* and the embodiments corresponding to FIGS. 7-8 is not repeated here. Furthermore, in the present embodiment, wall 706*a* is treated in the same or similar manner as was described for wall 706*b* in the embodiments corresponding to FIGS. 7-8. Once again, for purposes of brevity and clarity, the discussion of wall 706*a* and the embodiments corresponding to FIG. 9 will not repeat the entirety of the discussion corresponding to the embodiments of FIGS. 7-8. It should be noted, however, that the various embodiment variations mentioned in the discussion corresponding to FIGS. 7-8 may also apply to the embodiment of FIG. 9. With reference to wall 706*a*, in embodiments of the present invention, fuel is applied to the interior side (i.e., the side closest to annulus 708) of wall 706*a*. More particularly, in various embodiments, fuel is provided via port 906 and channel 908 to enable film cooling, via the provided fuel, along the interior side of wall 706*a*. Embodiments of the present invention are well suited to use with various other features, cooling channels, port shapes, port types and port configurations, as described, for example, above in accordance with the detailed description of the embodiments of FIGS. 1-6, to enable the application of the coolant fuel onto the interior surface of wall 706*a*. The direction of flow of the fuel as it provides film cooling is depicted by line 904 in FIG. 9. In various embodiments, by applying fuel to the interior side of wall 706*a*, the fuel provides film cooling while also providing a protective barrier to the interior side of wall 706*a*.

Referring still to FIG. 9, various embodiments of the present invention also provide an oxidizer along, for example, the exterior side (i.e., the side farthest from annulus 708) of wall 706*a*. The direction of flow of the oxidizer along the exterior surface of wall 706*a* is depicted by line 910 in FIG. 9. More particularly, in various embodiments, the oxidizer is provided via a port or ports, not shown. Furthermore, embodiments of the present invention are well suited to use with various other features, cooling channels, port shapes, port types, and port configurations, as described above in detail in accordance with the embodiments of FIGS. 1-6, to provide the oxidizer along the exterior surface of wall 706*a*. It should be noted that embodiments of the present invention are also well suited to use with various oxidizers including, but not limited to, air, liquid oxygen, hydrogen peroxide, and the like. Also, in various embodiments of the present invention, providing a flow of oxidizer along the exterior surface of wall 706*a*, as depicted by line 910, will cool wall 706*a*.

Referring still to FIG. 9, in embodiments of the present invention, the fuel used for film cooling of interior surface 706*a* and the oxidizer directed along the exterior surface of wall 706*a* will combine after they pass the rear edge 912 of wall 706*a*. A circle 914 is shown in FIG. 9 to figuratively depict a region at which the coolant fuel and the oxidizer combine. It should be noted that circle 914 is merely a graphical representation of the combination of the coolant fuel and the oxidizer, and that the combination of the coolant fuel and the oxidizer can occur at a region other than within or near circle 914.

Referring again to FIG. 9, in various embodiments of the present invention, once the fuel used for film cooling of interior surface 706*a* and the oxidizer directed along the exterior surface of wall 706*a* have passed the rear edge 912 of wall 706*a*, and have combined, a secondary combustion is generated. In embodiments of the present invention, the secondary combustion will occur due to sources of ignition readily present outside of annulus 708. Hence, in the embodiment of FIG. 9, there are two secondary combustions. It should further be noted that embodiments of the present invention are also well suited to use in detonation-based propulsion engines having a plurality of annuli.

Figure 10:
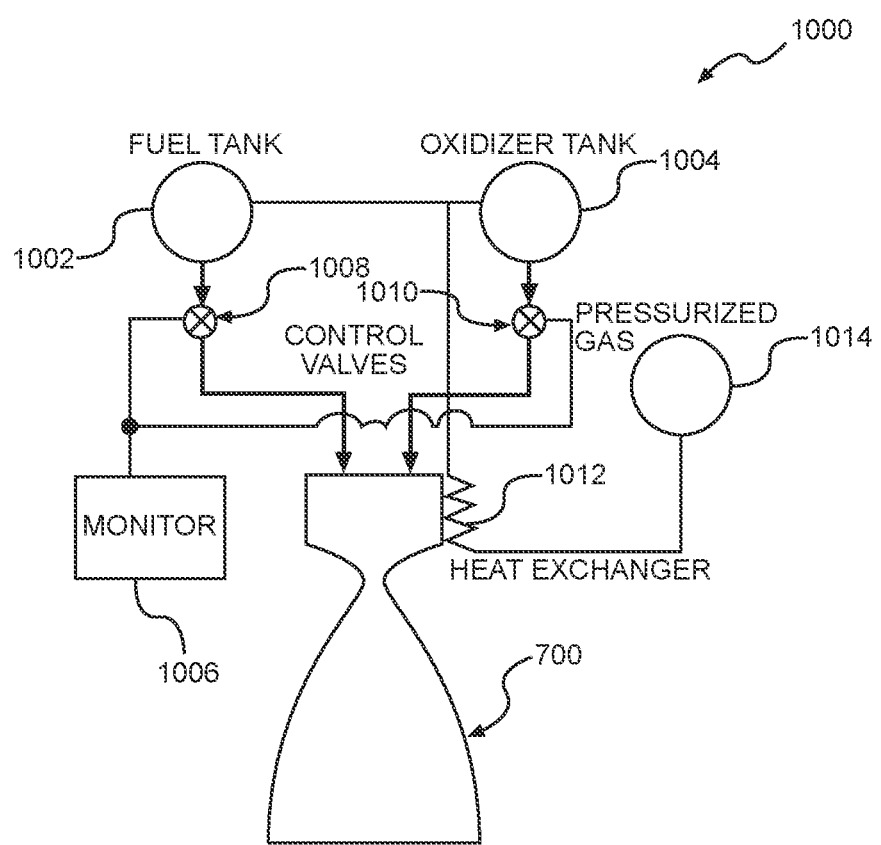
FIG. 10 is a schematic diagram of components of an improved rocket engine system wherein the coolant fuel is used to provide film cooling and, after being used to provide the film cooling, the coolant fuel is combined with an oxidizer to obtain a secondary combustion, in accordance with embodiments of the present invention.

Referring now to FIG. 10, a schematic diagram 1000 is provided depicting various components of a system in accordance with embodiments of the present invention. The components of schematic diagram 1000 are used, for example, in accordance with the with the embodiments described above in conjunction with FIGS. 7-9. Further, the components of schematic diagram 1000 are used, for example, in accordance with the with the embodiments described below in conjunction with FIG. 11.

Referring still to FIG. 10, in accordance with embodiments of the present invention, the system is comprised of a fuel tank 1002 for providing coolant fuel and an oxidizer tank 1004 for providing oxidizer. Additionally, in embodiments of the present invention, the system also includes a monitor 1006 coupled to control valves 1008 and 1010. In various embodiments, monitor 1006 utilizes control valves 1008 and 1010 to ensure that amount of coolant fuel and the amount of oxidizer have the necessary stoichiometry appropriate for the secondary combustion to occur in, for example, rotating detonation engine 700. In various embodiments, the present invention further includes a heat exchanger 1012 and a source of pressurized gas 1014.

Figure 11:
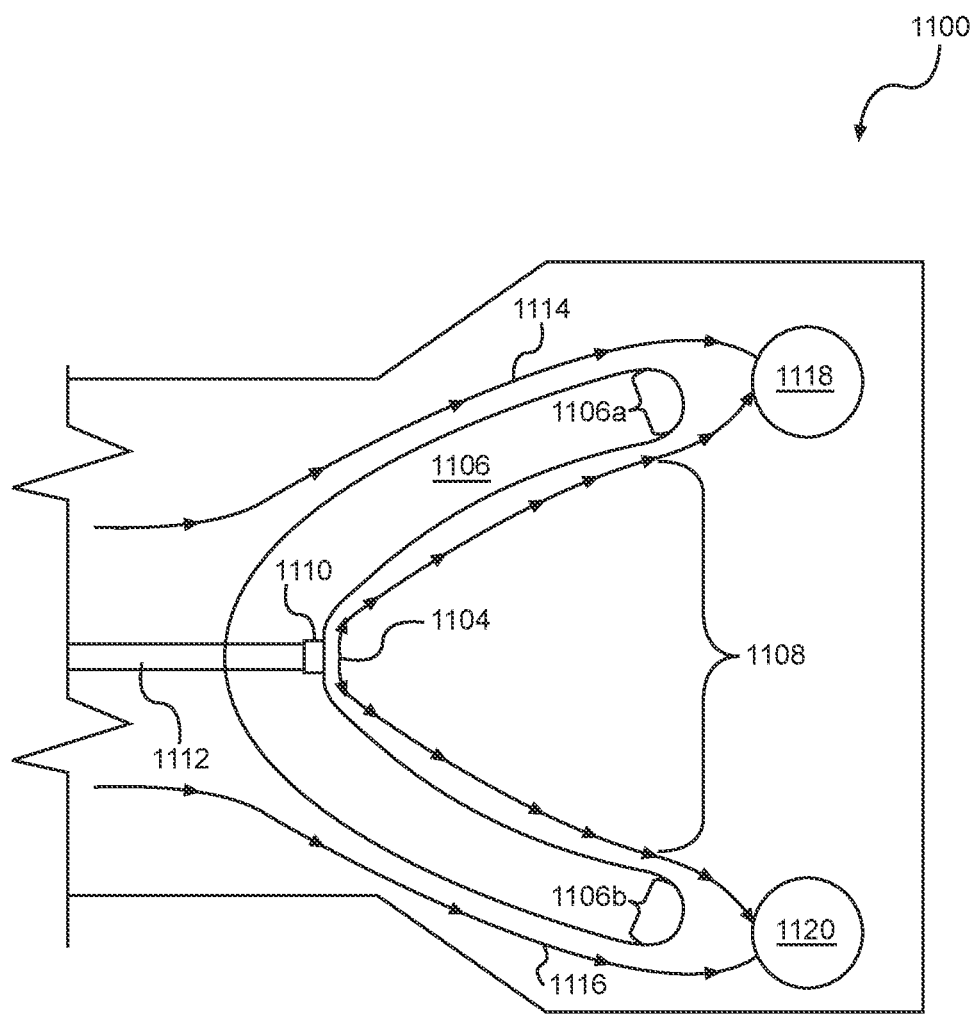
FIG. 11 is a cut-away view of a wall defining a chamber wherein combustion occurs in a rocket engine and wherein the wall is treated, in accordance with embodiments of the present invention.

Referring now to FIG. 11, a cut-away view 1100 of a combustion chamber wall 1106 of a propulsion engine. In embodiments of the present invention, fuel is applied to the interior side (i.e., the side closest to combustion region 1108) of wall 1106. More particularly, in various embodiments, fuel is provided via port 1110 and channel 1112 to enable film cooling, via the provided fuel, along the interior side of wall 1106. Embodiments of the present invention are well suited to use with various other features, cooling channels, port shapes, port types and port configurations, as described, for example, above in accordance with the detailed description of the embodiments of FIGS. 1-6, to enable the application of the coolant fuel onto the interior surface of wall 1106. The direction of flow of the coolant fuel as it provides film cooling is depicted by line 1104 in FIG. 11. In various embodiments, by applying fuel to the interior side of wall 1106, the fuel provides film cooling while also providing a protective barrier to the interior side of wall 1106. By providing a protective barrier, embodiments of the present invention produce a more reliable rocket engine. Specifically, the protective barrier provided by the fuel, and the corresponding film cooling of the interior side of wall 1106, reduces the frequency to inspect, or even the need to replace, wall 1106. Hence, embodiments of the present invention are well suited to use with reusable rocket engines. That is, the various embodiments of the present invention can extend the life of a reusable rocket, and/or increase the number times that reusable rocket can be used.

Referring still to FIG. 11, various embodiments of the present invention also provide an oxidizer along, for example, the exterior side (i.e., the side farthest from combustion chamber 1108) of wall 1106. The direction of flow of the oxidizer along the exterior surface of wall 1106 is depicted by lines 1114 and 1116 in FIG. 11. More particularly, in various embodiments, the oxidizer is provided via a port or ports, not shown. Furthermore, embodiments of the present invention are well suited to use with various other features, cooling channels, port shapes, port types, and port configurations, as described above in detail in accordance with the embodiments of FIGS. 1-6, to provide the oxidizer along the exterior surface of wall 1106. It should be noted that embodiments of the present invention are also well suited to use with various oxidizers including, but not limited to, air, liquid oxygen, hydrogen peroxide, and the like. Also, in various embodiments of the present invention, providing a flow of oxidizer along the exterior surface of wall 1106, as depicted by lines 1114 and 1116, will cool wall 1106.

With reference again to FIG. 11, in various embodiments of the present invention, the oxidizer is at least partially comprised of air which is received, for example, at an air inlet region of rocket, and then directed along the exterior surface of wall 1106, as depicted by lines 1114 and 1116. Additionally, in various embodiments, of the present invention, the oxidizer may be comprised of more than one oxidizing agent. As described above in detail, in various embodiments, the amount of coolant fuel and the amount of oxidizer are controlled to ensure that the stoichiometry between the coolant fuel and oxidizer is appropriate for the secondary combustion.

Referring still to FIG. 11, in embodiments of the present invention, the fuel used for film cooling of interior surface 1106 and the oxidizer directed along the exterior surface of wall 1106 will combine after they pass the rear edges 1106a and 1106b of wall 1106. Circles 1118 and 1120 are shown in FIG. 11 to depict the regions at which the coolant fuel and the oxidizer combine. It should be noted that circles 1118 and 1120 are merely a graphical representation of the combination of the coolant fuel and the oxidizer, and that the combination of the coolant fuel and the oxidizer can occur at regions other than within or near circles 1118 and 1120.

Furthermore, in the present embodiment, wall 1106 is treated in the same or similar manner as was described for wall 706b in the embodiments corresponding to FIGS. 7-9. Once again, for purposes of brevity and clarity, the discussion of wall 1106 and the embodiments corresponding to FIG. 11 will not repeat the entirety of the discussion corresponding to the embodiments of FIGS. 7-9. It should be noted, however, that the various embodiment variations mentioned in the discussion corresponding to FIGS. 7-9 may also apply to the embodiment of FIG. 11.

Referring again to FIG. 11, in various embodiments of the present invention, once the fuel used for film cooling of interior surface 1106 and the oxidizer directed along the exterior surface of wall 1106 have passed the rear edges 1106a and 1106b of wall 1106, and have combined, a secondary combustion is generated. In embodiments of the present invention, the secondary combustion will occur due to sources of ignition readily present outside of combustion chamber 1108.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended Claims is not necessarily limited to the specific features or acts described above. Rather, the specific features and acts described above are disclosed by way of illustration and as example forms of implementing the Claims and their equivalents.

What is claimed is:

1. A method for increasing efficiency of a propulsion engine, said method comprising:
applying a coolant fuel along a first surface of a wall partially defining a combustion chamber of said propulsion engine, a detonation occurring within said combustion chamber, said coolant fuel providing film cooling of said first surface of said wall;
applying an oxidizer to a second surface of said wall partially defining said combustion chamber;
monitoring a flow of said coolant fuel and a flow of said oxidizer; and
controlling said flow of said coolant fuel and said flow of said oxidizer to provide a stoichiometry of a combination of said coolant fuel and said oxidizer, after said coolant fuel has completed said film cooling of said first surface of said wall, such that said stoichiometry of said combination of said coolant fuel and said oxidizer permits a secondary combustion, separate from said detonation, of said combination of said coolant fuel and said oxidizer such that said secondary combustion of said combination of said coolant fuel and said oxidizer provides an increased thrust, in combination with the detonation and relative to thrust provided solely by the detonation, for said propulsion engine, wherein said increased thrust increases said efficiency of said propulsion engine.

2. The method as recited in claim 1, wherein said applying said coolant fuel along said first surface of said wall provides a protective barrier to said first surface of said wall.

3. The method as recited in claim 1, further comprising:
applying said coolant fuel to said first surface of said wall using at least one port proximate said first surface of said wall.

4. The method as recited in claim 1, wherein said applying said oxidizer to said second surface of said wall comprises applying liquid oxygen to said second surface of said wall.

5. The method as recited in claim 1, wherein said applying said oxidizer to said second surface of said wall comprises applying air to said second surface of said wall.

6. The method as recited in claim 1, wherein said applying said oxidizer to said second surface of said wall comprises applying hydrogen peroxide to said second surface of said wall.

7. A detonation engine system comprising:
a rotating detonation engine, the rotating detonation engine comprising an annulus wherein a detonation occurs;
a coolant source containing a coolant fuel, said coolant source coupled to provide said coolant fuel to a first surface of a wall partially defining said annulus, wherein said coolant fuel provides film cooling of said first surface of said wall;
an oxidizer source, said oxidizer source coupled to provide an oxidizer to a second surface of said wall partially defining said annulus; and
a monitor configured to control flow of said coolant fuel and flow of said oxidizer, said monitor further configured to ensure that a stoichiometry of a combination of said coolant fuel and said oxidizer, after said coolant fuel has completed said film cooling of said first surface of said wall, permits a secondary combustion, separate from the detonation, of said combination of said coolant fuel and said oxidizer.

8. The detonation engine system of claim 1, wherein said film cooling of said first surface of said wall by said coolant fuel provides a protective barrier to said first surface of said wall.

9. The detonation engine system of claim 1, further comprising:
at least one port disposed to apply said coolant fuel to said first surface of said wall.

10. The detonation engine system of claim 9, wherein said oxidizer is comprised of liquid oxygen.

11. The detonation engine system of claim 9, wherein said oxidizer is comprised of air.

12. The detonation engine system of claim 9, wherein said oxidizer is comprised of hydrogen peroxide.

13. The detonation engine system of claim 9, wherein said wall further comprises:
at least one cooling passage formed therein; and
wherein said coolant source is fluidically coupled to said at least one cooling passage.

14. A rocket engine system comprising:
a rocket engine, the rocket engine comprising a combustion chamber wherein a detonation occurs,
a coolant source containing a coolant fuel, said coolant source coupled to provide said coolant fuel to a first surface of a wall partially defining the combustion chamber, wherein said coolant fuel provides film cooling of said first surface of said wall;
an oxidizer source, said oxidizer source coupled to provide an oxidizer to a second surface of said wall partially defining said combustion chamber; and
a monitor configured to control flow of said coolant fuel and flow of said oxidizer, said monitor further configured to ensure that a stoichiometry of a combination of said coolant fuel and said oxidizer, after said coolant fuel has completed said film cooling of said first surface of said wall, permits a secondary combustion, separate from the detonation, of said combination of said coolant fuel and said oxidizer.

15. The rocket engine system of claim 14, wherein said film cooling of said first surface of said wall by said coolant fuel provides a protective barrier to said first surface of said wall.

16. The rocket engine system of claim 14, further comprising:
at least one port disposed to apply said coolant fuel to said first surface of said wall.

17. The rocket engine system of claim 14, wherein said oxidizer is comprised of liquid oxygen.

18. The rocket engine system of claim 14, wherein said oxidizer is comprised of air.

19. The rocket engine system of claim 14, wherein said oxidizer is comprised of hydrogen peroxide.

20. The rocket engine system of claim 14, wherein said wall further comprises:
at least one cooling passage formed therein; and
wherein said coolant source is fluidically coupled to said at least one cooling passage.

21. The rocket engine system of claim 14, wherein said applying said coolant fuel to said first surface of said wall further comprises:
applying said coolant fuel to said first surface of said wall using at least one cooling passage formed in said wall.

* * * * *